UNITED STATES PATENT OFFICE.

JOHN H. MORRELL, OF OTTUMWA, IOWA.

PROTECTIVE AND PRESERVATIVE COATING.

1,004,674.  Specification of Letters Patent.  Patented Oct. 3, 1911.

No Drawing.  Application filed May 19, 1909. Serial No. 496,998.

*To all whom it may concern:*

Be it known that I, JOHN H. MORRELL, a citizen of the United States, residing at Ottumwa, in the county of Wapello and State of Iowa, have invented certain new and useful Improvements in Protective and Preservative Coating; and I do hereby declare the following to be a full, clear, and exact description of the invention, such as will enable others skilled in the art to which it appertains to make and use the same.

The present invention relates to a process of preserving meats and to a protective and preservative coating for the same.

Many attempts have heretofore been made to protect and preserve meats, and particularly hams, bacon and other similar packing-house products, so that they may be shipped to and kept in warm and damp climates without danger of decay or deterioration. In some cases preservative chemicals or compounds have been employed which, while preventing decay or change in the meat upon which they were used, have nevertheless been deleterious and injurious to health. In other instances less harmful substances have been resorted to but these either affected the flavor of the meat or were only partly efficacious in preventing change and deterioration.

The present invention seeks to provide a process of producing or applying a protective and preservative skin or coating for the meat without the use of chemicals or any deleterious substances, yet which shall protect and preserve the meat without in any way injuring the flavor thereof.

With these objects in view, the present invention consists of the preservative and protective coating and the process of producing the same hereinafter described and more particularly defined in the claims.

In carrying out the present invention the meat, which is to be preserved, is first thoroughly cleaned and all superfluous grease or fat removed from the outside. The meat is then carefully wrapped in any suitable absorbing paper, the object of which is to take up and absorb any moisture that may work out upon the surface of the meat from the interior thereof, thus preventing the formation of mold and at the same time improving the appearance of the meat when it is unwrapped by the consumer. One or more layers of parchment paper are next applied, the object of which is to keep in any grease that may work through the absorbing paper and to keep out moisture, parchment paper being both grease and moisture resisting. Over the parchment paper is sewn a tight covering of strong cotton cloth to which is applied, conveniently by immersion of the entire package, a solution of what I call marine jelly. This is absorbed to greater or less extent by the cloth and is allowed to harden, forming upon the package a skin or coating of the jelly that not only is impervious to air, but which is unaffected by the intense heat or excessive moisture of southern and tropical climates. Meats protected by such a coating or covering not only resist all change and decay, but retain within themselves the natural moisture and juices which contribute so essentially to the flavor of the meat. The marine jelly is entirely harmless and there is no danger whatever in eating it, as has been the case with many of the preservative coatings which have heretofore been used.

What I have termed marine jelly is prepared from Japanese sea weed which is boiled in water until it reaches a mucilaginous consistency. If desired some harmless coloring material may be added to the liquid jelly to give it any preferred color.

I am aware that it has been proposed to coat meats and other substances to be preserved, with a solution of gelatin and alum, which upon hardening leaves a skin or covering. The present invention, however, is distinguished therefrom not only by the fact that no preservative chemicals or compounds are employed, but also in that the marine jelly is unaffected by the heat and moisture of tropical climates, differing essentially from ordinary gelatin in this respect.

Having thus described the present invention, what is claimed as new is:

1. A protective and preservative covering for meats comprising an inner wrapping of absorbent material, an intermediate layer of moisture-proof paper, and an outer tight covering of textile material having a coating consisting solely of marine jelly, substantially as described.

2. The method of forming a protective and preservative covering for meats which consists in wrapping the meat in absorbent material, applying a layer of moisture-proof paper, tightly enveloping the whole in a suitable covering of textile fabric, and finally immersing in a solution consisting solely of marine jelly of a mucilaginous consistency for a sufficient length of time to permeate the pores of the textile fabric and form an impervious covering, substantially as described.

In testimony whereof I affix my signature, in presence of two witnesses.

JOHN H. MORRELL.

Witnesses:
J. C. STENTZ,
R. L. KENDALL.

Copies of this patent may be obtained for five cents each, by addressing the "Commissioner of Patents, Washington, D. C."